United States Patent Office 3,344,190
Patented Sept. 26, 1967

3,344,190
O-(β-HYDROXYETHYL)-HYDROXYLAMINES AND PROCESS FOR THEIR MANUFACTURE
Bruno J. R. Nicolaus, Milan, Italy, and Emilio Testa, Vacallo Tessin, Switzerland, assignors to Lepetit S.p.A., Milan, Italy
No Drawing. Original application Feb. 21, 1962, Ser. No. 174,671, now Patent No. 3,184,500, dated May 18, 1965. Divided and this application Sept. 21, 1964, Ser. No. 398,103
Claims priority, application Great Britain, Feb. 22, 1961, 6,498/61
9 Claims. (Cl. 260—584)

The present invention relates to substituted hydroxylamines and to a method for their manufacture.

This application is a division of our copending application, Serial No. 174,671, filed February 21, 1962 now Patent No. 3,184,500.

The compounds of this invention are of the general formula $$HOCH_2CH_2ONR_2$$

wherein R is hydrogen or a lower alkyl radical. These compounds are useful particularly as intermediates for the manufacture of pharmaceutical preparations, such as compounds of the formula $$AcylOCH_2CH_2ONR'_2$$

wherein Acyl represents a lower alkanoyl or a benzoyl, phenylacetyl, diphenylacetyl, phenylcarbamyl, cinnamoyl or succinyl radical, R' is a lower alkyl radical, and their quaternary salts with lower alkyl halogenides. These compounds are highly active in pharmacological tests on animals. For instance, O-(β-acetoxyethyl)-N,N-dimethyl hydroxylamine methiodide and the β-succinyl analogue of the same, as well as the corresponding N,N-di-lower alkyl homologues in which the alkyl is ethyl, propyl or butyl, are nearly as active as acetylcholine and succinylcholine and the well known quaternary addition salts of the same as curare-like agents. O-(β-diphenylacetoxyethyl)-N,N-dimethyl hydroxylamine hydrochloride shows a strong analgesic and sedative action. O-(β-phenylcarbamyloxyethyl)-N,N-dimethyl hydroxylamine has a marked tranquillizing effect. These main activities are more or less shared by a large majority of the compounds of the class.

The process for preparing the compounds of this invention and their conversion to the esters claimed in the above-identified parent application may be represented as follows:

$$H_5C_2OCOCH_2ONHCO_2C_2H_5$$
$$(I) \rightarrow HOCH_2CH_2ONHCO_2C_2H_5$$
$$(II) \rightarrow HOCH_2CH_2ONH_2 \ (III) \rightarrow HOCH_2CH_2ONR'_2$$
$$(IV) \rightarrow AcylOCH_2CH_2ONR'_2$$

The starting O - carbethoxymethyl - N - carbethoxy-hydroxylamine is hydrogenated with lithium aluminium hydride in an inert anhydrous organic solvent at a temperature not exceeding 0° C. This provision is necessary to avoid evolution of ammonia and carbon dioxide with formation of ethylene glycol. The obtained O-(β-hydroxyethyl)-N-carbethoxy-hydroxylamine (II) is refluxed with an aqueous solution of a strong mineral acid, such as hydrochloric acid, giving the key intermediate O-(β-hydroxyethyl)-hydroxylamine (III). This is N-alkylated by conventional processes to yield the N,N-dialkyl derivative IV. For this purpose, when the dimethyl derivative is desired, III can be conveniently reacted with a mixture of formic acid and formaldehyde. In all other cases, i.e., when R' of the general formula is a lower alkyl other than methyl, III is reacted with the appropriate alkyl halogenide, such as ethyl or butyl bromide. The O-acylation of IV is also performed by conventionally acylation processes, as f.i., by employing the appropriate acyl halide or anhydride.

The last steps of the process, though old in the art, in connection with other compounds, are however to be considered as novel in our processes in the sense that the physical and chemical properties of O-(β-hydroxyethyl)-hydroxylamine were entirely unknown at the dates of our parent application. No information was available about the stability of the N—O linkage, and quite different results could be expected by subjecting the key intermediate III to such vigorous reactions as refluxing with alkyl halogenides or heating with a carboxylic acid anhydride. The achieved results are therefore to be considered as an extremely useful tool for further study in the field of organic medicinal chemistry.

The following examples are illustrative of the invention.

EXAMPLE 1

*O-(β-propionoxyethyl)-N,N-dimethyl-hydroxylamine*

To 71 g. lithium aluminum hydride in 4000 ml. anhydrous ethyl ether 237 g. of O-carbethoxymethyl-N-carbethoxy-hydroxylamine dissolved in 1000 ml. ethyl ether are added under stirring at 0° C. Stirring is continued for 5 hours; then solid $CO_2$ in small pieces and $H_2O$ (150 ml.) are added over a period of 1.5 hours. The mixture is filtered, the inorganic compounds washed with ethyl ether, the ether solution dried over $Na_2SO_4$ and concentrated in vacuo; an oil is obtained which is distilled through a fractionating column. Yield 46% of N-carbethoxy - O-(β-hydroxyethyl)-hydroxylamine; B.P. 122–125°/0.8 mm.

A mixture of 19.8 g. of N-carbethoxy-O-(β-hydroxyethyl)-hydroxylamine and 100 ml. 15% HCl is refluxed for 1 and ½ hours. The clear solution is concentrated in vacuo on a water bath; the oily residue is taken up with 150 ml. anhydrous methyl alcohol and the solution neutralized with alcoholic KOH. The inorganic salt is filtered off, and the solution concentrated in vacuo. An oil is obtained, which distilled through a fractionating column gives O-(β-hydroxyethyl)-hydroxylamine. B.P. 61–62°/1 mm. Yield 74.1%.

Into 146.5 g. 90% formic acid cooled with ice-water, 41 g. O-(β-hydroxyethyl)-hydroxylamine and 107.5 g. 30.1% formaldehyde are added dropwise under stirring, then the mixture is refluxed 3½ hours. The obtained solution is cooled to 0° and under stirring 69.2 g. concentrated HCl are added. By concentrating in vacuo an oil is obtained which is dissolved in 250–300 ml. $CH_3OH$. Sodium methoxide in methyl alcohol is added to adjust the pH to 8–10, the inorganic salt is filtered off and the solution concentrated in vacuo. The oily residue is rectified with a fractionating column. Yield 36.6% of O-(β-hydroxyethyl)-N-dimethyl-hydroxylamine.

To a mixture of 4 g. of O-(β-hydroxyethyl)-N-dimethyl-hydroxylamine in 25 ml. of tetrahydrofuran and 3.85 g. of triethylamine kept at 0°, 3.52 g. of propionyl chloride in 15 ml. of tetrahydrofuran are added. The mixture is refluxed for 1½ hours. After filtration of the precipitated salt, the solution is concentrated in vacuo and the oily residue is rectified with a fractionating column. Yield 45%, B.P. 78–83°/45 mm. Hg.

EXAMPLES 2–4

The following derivatives are prepared by an analogous procedure to that described in Example 1; R and acyl are, located as in the generic formula above:

| R | Acyl | B.P. | Yield, percent |
|---|---|---|---|
| Dimethyl $(CH_3)_2NOCH_2CH_2OCOCH_3$ | Acetyl | 88–89°/48 mm. Hg | 73 |
| Dimethyl $(CH_3)_2NOCH_2CH_2OCOC_6H_5$ | Benzoyl | 103–5°/2 mm. Hg | 39 |
| Dimethyl $(CH_3)_2NOCH_2CH_2OCOCH_2C_6H_5$ | Phenylacetyl | 95–97°/0.5 mm. Hg | 62 |

EXAMPLE 5

*O-(β-acetoxyethyl)-N,N-dimethyl-hydroxylamine methiodide*

A mixture of 9.6 g. O-(β-hydroxyethyl)-N,N-dimethyl-hydroxylamine acetate in 50 ml. anhydrous ethyl ether, 48 g. $CH_3I$ and 3 ml. anhydrous methyl alcohol is stirred for 10 minutes. After standing 48 hours a yellow precipitate forms. Yield 57% M.P. 92–95°.

EXAMPLE 6

*O-(β-cinnamoylethyl)-N,N-dimethyl-hydroxylamine*

To a mixture of 2.5 g. O-(β-hydroxyethyl)-N-dimethyl-hydroxylamine, 25 ml. anhydrous ethyl ether and 2.4 g. triethylamine, cooled at 0°, 3.96 g. cinnamoyl chloride in 15 ml. anhydrous ethyl ether are added under stirring. The mixture is refluxed for 2 hours, filtered and washed with ethyl ether. The ether solution is washed with a saturated solution of $NaHCO_3$, then with 10% HCl and water, dried over $Na_2SO_4$ and concentrated in vacuo. The obtained oil is distilled in vacuo. Yield 53%, B.P. 121–123°/0.5 mm. Hg.

EXAMPLE 7

*O-(β-diphenylacetoxyethyl)-N,N-dimethyl-hydroxylamine hydrochloride*

To a mixture of 2.1 g. O-(β-hydroxyethyl)-N-(dimethyl)-hydroxylamine, 21 ml. of anhydrous ethyl ether and 2.1 g. of triethylamine, a solution of 4.6 g. of α,α-diphenylacetylchloride in 15 ml. of diethyl ether is added dropwise under stirring, keeping the temperature at 0°. Stirring is continued 1 hour, then the mixture is refluxed for 1 hour. After standing overnight the mixture is filtered, the solvent removed and the oily residue crystallized from anhydrous isopropyl alcohol. Yield 60%, M.P. 105–110°.

EXAMPLE 8

*O-(β-phenylcarbamyloxyethyl)-N,N-dimethyl-hydroxylamine*

A mixture of 14.1 g. O-(β-hydroxyethyl)-N,N-dimethyl-hydroxylamine and 17.6 g. of phenylisocyanate is stirred at room temperature and then warmed on a water bath at 50–55° for 1 hour. A white solid precipitates, which is collected and crystallized from light petroleum. Yield 77%, M.P. 62–64°.

EXAMPLE 9

*O-(β-acetoxyethyl)-N,N-diethylhydroxylamine*

A mixture of 40 g. of O-(β-hydroxyethyl-hydroxyl- amine, 174 g. of ethyl iodide, 93.6 g. of sodium bicarbonate and 400 ml. of anhydrous ethanol is refluxed for 8 hours and allowed to stand overnight at room temperature. After filtration the solution is evaporated to dryness.

The residue is distilled in vacuo, collecting at 48–49°/1.2 mm. Hg. Yield 34 g. of O-(β-acetoxyethyl)-N,N-diethyl-hydroxylamine, B.P. 73° C. The methiodide is prepared through conventional procedures and has M.P. 62–65° C.

EXAMPLES 10–11

By the same procedures as described in the preceding examples the following compounds were prepared:

O-(β-hydroxyethyl)-N,N-dipropylhydroxylamine, B.P. 58° C./0.6 mm. Hg.

O-(β-acetoxyethyl)-N,N-dipropylhydroxylamine, B.P. 60–65°/0.6 m. Hg. The methiodide has M.P. 86–89° C.

O-(β-hydroxyethyl)-N,N-dibutylhydroxylamine, B.P. 77–78°/0.6 mm. Hg.

O-(β-acetoxyethyl)-N,N-dibutylhydroxylamine, B.P. 74–76°/0.6 mm. Hg. The methiodide has M.P. 54–55° C.

We claim:
1. An O-(β-hydroxyethyl)-hydroxylamine of the formula:

$$HOCH_2CH_2ON(R')_2$$

wherein R' is a member of the group consisting of hydrogen and lower alkyl.

2. An O-(β-hydroxyethyl)-N,N-dialkylhydroxylamine of the formula $$HOCH_2CH_2ON(R)_2$$

wherein R is a lower alkyl radical.

3. O-(β-hydroxyethyl)-hydroxylamine.
4. O-(β-hydroxyethyl)-N,N-dimethylhydroxylamine.
5. O-(β-hydroxyethyl)-N,N-dipropylhydroxylamine.
6. O-(β-hydroxyethyl)-N,N-dibutylhydroxylamine.
7. A process for preparing O-(β-hydroxyethyl)-hydroxylamine, which comprises hydrogenating O-carbethoxymethyl-N-carbethoxy-hydroxylamine with lithium aluminium hydride in an inert anhydrous organic solvent at a temperature below 0° C., and refluxing the obtained O-(β-hydroxyethyl)-N-carbethoxy-hydroxylamine with an aqueous solution of a strong mineral acid.

8. A process as in claim 7, wherein the inert anhydrous organic solvent is anhydrous ethyl ether.

9. A process as in claim 7, wherein the strong mineral acid is aqueous hydrochloric acid.

References Cited

UNITED STATES PATENTS 3,184,500  5/1965  Nicolaus et al. _____ 260–469

CHARLES B. PARKER, *Primary Examiner.*

D. R. PHILLIPS, *Assistant Examiner.*